United States Patent [19]

Carlson

[11] 4,069,652
[45] Jan. 24, 1978

[54] HARVESTING APPARATUS

[76] Inventor: Roy S. Carlson, 1204 N. Mcdonald, Deland, Fla. 32720

[21] Appl. No.: 447,988

[22] Filed: Mar. 4, 1974

[51] Int. Cl.² ............................................. A01D 46/00
[52] U.S. Cl. ................................................. 56/328 R
[58] Field of Search ............................ 56/328 R, 332

[56] References Cited

U.S. PATENT DOCUMENTS

| | | | |
|---|---|---|---|
| 2,698,508 | 1/1955 | Hollister | 56/332 |
| 3,077,720 | 2/1963 | Grove et al. | 56/328 R |
| 3,138,912 | 6/1964 | Mays et al. | 56/328 R |
| 3,413,787 | 12/1968 | Van Antwerp et al. | 56/328 R |
| 3,507,105 | 4/1970 | Mays et al. | 56/328 R |
| 3,517,496 | 6/1970 | Kemp et al. | 56/328 R |
| 3,530,654 | 9/1970 | Staats, Sr. et al. | 56/328 R |
| 3,552,107 | 1/1971 | Swift | 56/328 R |
| 3,613,868 | 10/1971 | Rickerd | 198/211 |

Primary Examiner—Russell R. Kinsey
Attorney, Agent, or Firm—Robert F. Ruemeli

[57] ABSTRACT

Harvesting apparatus particularly suited for picking citrus fruit, apples, and the like, has an adjustable boom mounted on a vehicle with a harvesting head secured to the free end of the boom for tilting and turning to either side and for forward and rearward tilting. A flexible and longitudinally expansible tube carries the picked fruit from the harvesting head to a suitable receptacle. A preferred embodiment of the harvesting head has a resiliently surfaced roller mounted for rotation in either of opposite directions between resiliently surfaced side walls of the head. As the roller gathers the fruit from a tree limb, the roller deposits the fruit in a passageway between the roller and one of the resilient side walls and rotates the fruit as it passes through a nip portion of the passageway, to release the fruit from the limb, and then release the limb from the harvesting head. Fingers spaced along either side wall prevent excessive movement of the limb lengthwise of the passageway and are mounted for upward movement to release the limb after the fruit has been removed from the limb. A second embodiment has a pair of contra-rotating rollers, one adjacent each of opposite resilient side walls of the head, and a third embodiment utilizes a rotating sphere within a resilient, inverted frusto-conical side wall of the head. Provision is made for varying the spacing between the side walls and roller or rollers, or sphere, in order to efficiently handle different sizes of fruit.

6 Claims, 10 Drawing Figures

U.S. Patent  Jan. 24, 1978  Sheet 1 of 3  4,069,652
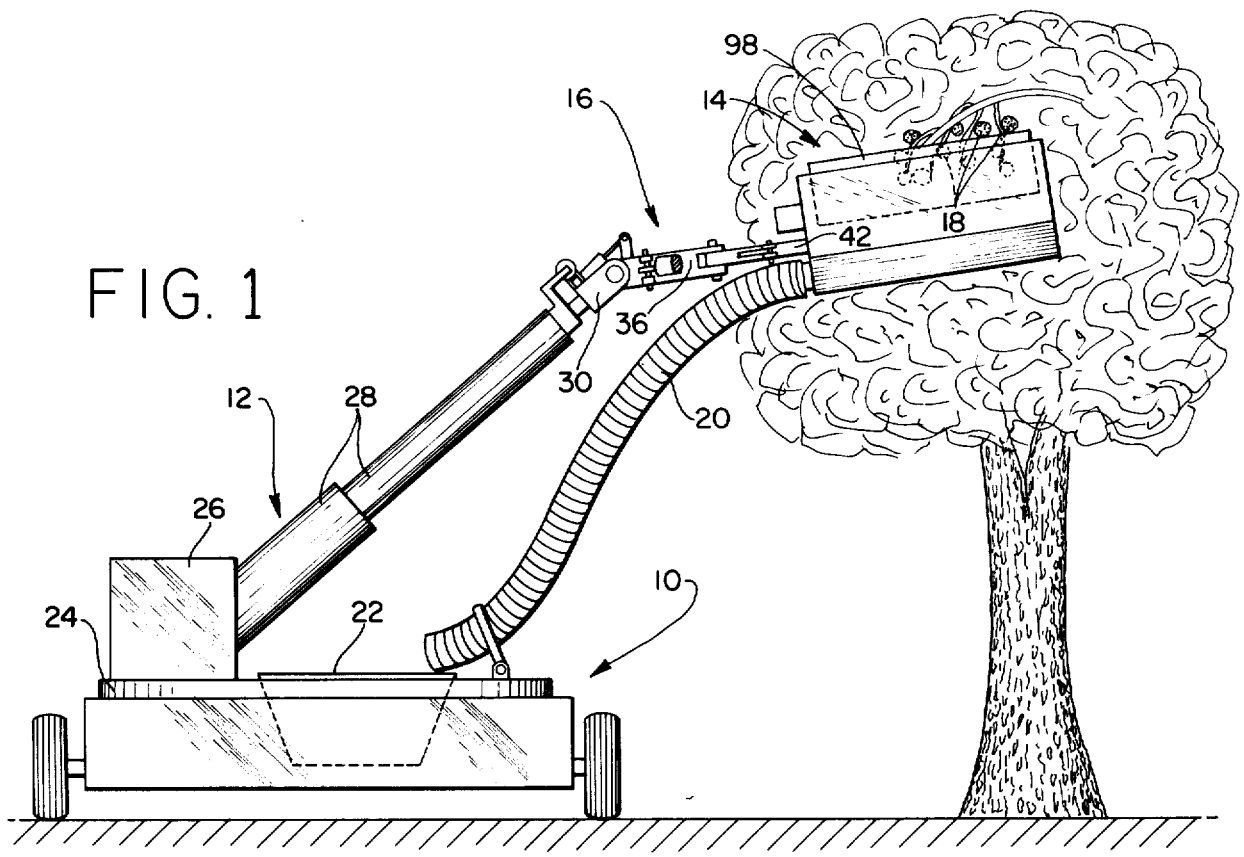
FIG. 1
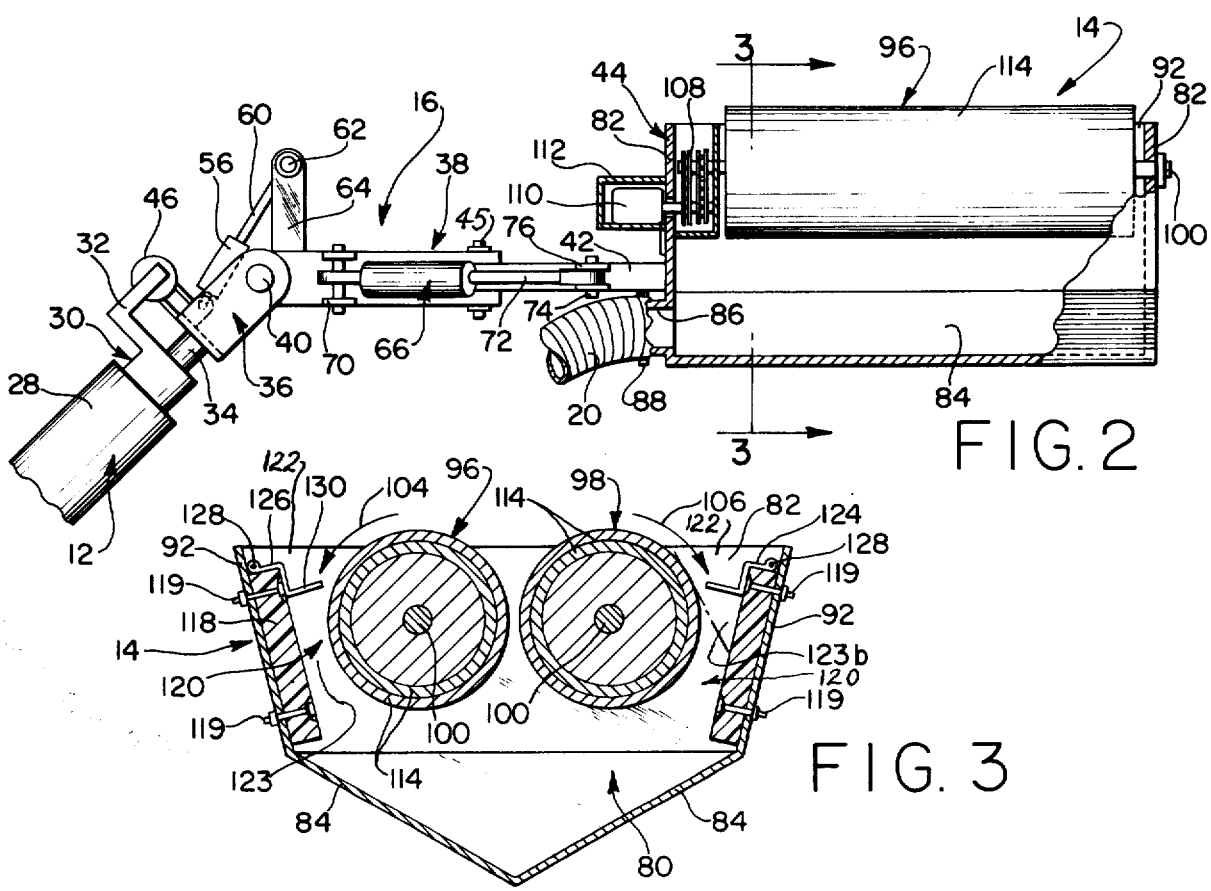
FIG. 2
FIG. 3

HARVESTING APPARATUS

This invention relates to harvesting apparatus and, more particularly, to such apparatus for picking fruit, and the like.

BACKGROUND OF THE INVENTION

Various types of harvesting apparatus for fruit, and the like, have been proposed, but as yet none has had any great commercial acceptance, particularly in the citrus industry. Complaints include previous harvesters missing or damaging an unacceptably high amount of the fruit, or damaging the tree, or being too slow in overall picking operation or too bulky to be effective in picking fruit in inner or upper portions of a tree.

Various harvesting apparatus or fruit, and the like, is shown in issued patents. For example, U.S. Pat. No. 3,552,107 shows a comb type harvester, and U.S. Pat. No. 3,530,654 shows a somewhat similar harvester having a rotating auger. A harvester having a roller for grasping a single fruit at a time and releasing it from its limb is shown in U.S. Pat. No. 3,413,787, in which the stem of the fruit is received in an upwardly opening notch to break the fruit loose from the limb. Because of the small sized entry for the fruit into the harvester, it is almost mandatory that an operator be positioned at the harvesting head, as indicated by the bucket hoist for an operator. Another patent using a roller for picking a single fruit at a time is shown in U.S. Pat. No. 2,698,508, has a side entry for the fruit so that precise positioning of the head is required. Another patent having a side entry, but of greater height than the immediately preceding patent, is U.S. Pat. No. 3,485,024, in which a pair of jaws have a series of vertical grippers which close on the fruit so that the fruit is stripped from the limb as the harvesting head is withdrawn from the tree. Another harvesting apparatus for citrus fruit is shown in U.S. Pat. No. 3,507,105, and has pairs of rollers for picking the fruit and delivering the fruit to a special conveyor which forms part of a telescopic boom for the harvesting head. The rollers of each pair are driven in opposite directions and at different speeds. Additionally, the rollers are pneumatic and guards are provided for limiting entry of a tree limb.

It is a primary object of this invention to provide a new and useful harvesting apparatus. More particularly, another object is provision of such apparatus which is efficient in picking the fruit and relatively easy to operate. Still another object is provision of a new and useful fruit harvesting apparatus, or the like, which is rugged, durable and economical in construction, and easy and inexpensive to maintain.

A feature of the harvesting apparatus is an adjustable boom and a harvesting head connected to the free end of the boom for effectively universal movement of the head relative to the boom. More particularly, the head may be tilted from side to side and from front to rear, and may be turned from side to side and, if desired, may be moved toward or away from the free end of the boom, thus providing for effective coverage of the entire tree.

Another feature of the apparatus is a harvesting head which is relatively narrow so that it may be positioned for picking fruit from upper an inner portions of a tree, with an elongated upwardly opening entrance for the fruit to facilitate operating the head from a location on the ground. A movable member of the head engages the fruit and moves it through a passageway having a short nip portion through which the fruit is rotated just sufficiently to free it from the limb and then release the limb as the fruit passes from the head to a suitable collector. The movable member may be in the form of a roller or a sphere having a substantially uniformly resiliently yieldable surface for engaging the fruit and moving it through the passageway with the fruit in engagement with a fixed surface of the head which also preferably has a substantially uniformly resiliently yieldable face for engaging the fruit. Provision of a fixed face opposed to the movable face provides a head which is relatively narrow, while permitting the head to be elongated so that precise positioning of the head relative to a group of oranges or other fruit to be picked, is not essential.

The width of the nip portion, which grips the fruit, may be adjustable either by adjusting the position of the fixed side wall, or by raising or lowering the movable member, or both. An upwardly opening entrance to the passageway effectively prevents the fruit from dropping away from the head after the fruit has been engaged by the roller or sphere, as is likely to occur with a head having a side opening entrance.

In brief, the invention is directed to harvesting apparatus for fruit, or the like, the apparatus including a vehicle having an adjustable boom mounted for carrying a harvesting head. The head is mounted on the free end of the boom for effectively universal movement to provide for easy and effective positioning of the head relative to the fruit to be picked from a tree. A movable member, in the form of a roller or sphere, for example, forms part of the head and cooperates with an operationally fixed member of the head to provide a passageway having an upwardly opening entrance for the fruit and a nip portion for rotating the fruit to break it free from the limb. Both members are preferably each of substantially constant resiliency. The nip portion is preferably adjustable for accommodating fruit of different sizes. Fingers, extending along the length of the entrance, limit movement of a limb lengthwise of the entrance as the fruit is picked from the limb, the fingers being upwardly movable for releasing the limb after the fruit has been removed.

These and other objects and advantages of the invention will be apparent from the following description and the accompanying drawings.

BRIEF DESCRIPTION OF THE DRAWINGS

FIG. 1 is a schematic, elevational view of the harvesting apparatus in operation while picking fruit from a tree limb;

FIG. 2 is an enlarged, fragmentary, schematic, elevational view of a portion of the apparatus as shown in FIG. 1, with parts broken away and removed for clearer illustration;

FIG. 3 is an enlarged, fragmentary, schematic, sectional view taken generally along the line 3—3 in FIG. 2;

DESCRIPTION OF THE ILLUSTRATED EMBODIMENTS

Figure 4:
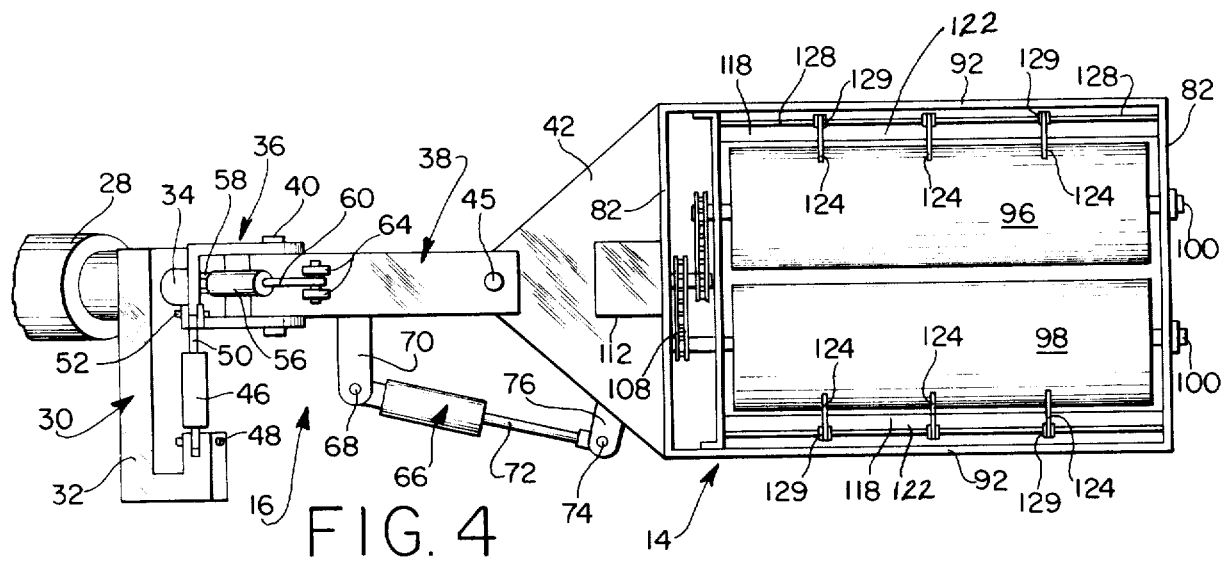
FIG. 4 is a fragmentary schematic, plan view of the portion of the apparatus shown in FIG. 2.

Referring to FIG. 1 of the drawings, the harvesting apparatus including a mount in the form of a suitable vehicle 10, such as a trailer, adapted to move across the ground and carrying a boom assembly 12 with a harvesting head 14 secured to the free end of the boom, as by a positioning mechanism 16. The harvesting head 14 is initially positioned by the boom assembly 12 proximate a tree limb and the positioning mechanism 16 provides effective universal movement of the head 14 to more precise position to pick the fruit 18, such as oranges, lemons, apples, or the like, from the limb. From the head 14, the oranges pass through a flexible and extensible tube 20 to a suitable receiver such as a basket 22 which may be releasably secured to the vehicle 10 (as shown) or seated on the ground adjacent the vehicle.

Any suitable type of boom assembly 12 may be provided, and the illustrated boom assembly includes a turntable 24 pivotally mounted on the vehicle 10 and carrying a drive mechanism within a housing 26 for rotating the turntable 24 and for elevating and telescoping a boom 28 which is pivotally mounted to the turntable 24 within the housing 26.

The positioning mechanism 16 is mounted to the free end of the boom 28 and, as previously mentioned, carries the harvesting head 14. As may best be seen in FIGS. 2 and 4, a body 30 of the positioning mechanism 16 is suitable fixedly secured to the free end of the boom 28 and has an integral arm 32, and a journal for receiving an axle 34 of a yoke member 36 to which a head attaching arm 38 is pivoted for swinging movement about a pin 40. The arm 38 is bifurcated at its free end for receiving a mounting plate 42 of a body 44 of the harvesting head 14. A pivot pin 45 mounts the plate 42 on the arm 38 for swinging movement about a generally upright axis. Either the attaching arm 38, or the mounting plate 42, or both, may be increased or decreased in length over that shown in the drawing, in order to vary the distance of the harvesting head 14 from the boom 28 and the other portions of the positioning mechanism 16, depending on the type of fruit being harvested, so that the head 14 be positioned close in the top center of the tree for picking fruit from this area. If desired, the attaching arm 38 may be adjustable in length and operated by a cylinder or other power source, for automatically varying its length.

An operating cylinder 46 is pivoted by means of a pin 48 to the arm 32 of the body 30 and has the free end of its piston rod 50 pivoted by means of a pin 52 to a bifurcated portion of the yoke member 36; for pivoting the yoke member 36 about axle 34 and tilting the harvesting head 14 from side to side. A second operating cylinder 56 tilts the head 14 from front to rear about the pivot pin 40. This cylinder is pivoted to a bifurcated portion 58 of the yoke member 36, and has the free end of its piston rod 60 pivoted, by means of a pin 62 to a bifurcated portion 64 extending upwardly from the head attaching arm 38 which mounts the harvesting head 14. A third operating cylinder 66 swings the head 14 from side to side about pivot pin 45. This cylinder is pivoted by means of a pin 68 to a bifurcated portion 70 extending sideways from the head mounting arm 38, and has the free end of its piston rod 72 pivotally connected by means of a pin 74 to a bifurcated portion 76 extending sideways from the mounting plate 42 of the harvesting head body 44, for swinging the head from side to side.

The operating cylinders may be of any suitable type, either pneumatic or hydraulic, for example. For simplicity of illustration, operating fluid conduits are not shown in the drawings. The conduits are connected to a control console (not shown) which is preferably part of the housing 26, and also carries the controls for the boom assembly 12.

The harvesting head 14 shown in FIGS. 1–4 includes the body 44 to which the mounting plate 42 is fixedly secured, as by welding or the like. A lower portion of the body 44 provides a receiver 80 for the picked fruit. The body has generally parallel opposed end walls 82 and converging lower side walls 84, with a tube connector 86 (FIG. 2) opening through the lower portion of the left hand end wall 82 adjacent the positioning mechanism 16, to which the flexible and extensible tube 20 is connected, as by a clamping collar 88, for delivery of the fruit to the basket 22. End walls 82 are connected with upwardly diverging side walls 92 extending upwardly from the side walls 84 of the receiver 80. The upper portions of the end walls 82 and side walls 92 form an open top 94 of the body 14 for passage of the fruit from the tree limb into the receiver 80, as will be described later.

In order to pick the fruit 18 from the limb, a pair of movable members, illustrated in the form of rotating rollers 96 and 98, have shafts 100 suitably journaled on one end wall 82 at an intermediate wall on the other end wall 82 of the body 44. With reference to FIG. 3, the roller 96 is driven in a counter-clockwise direction, as indicated by the arrow 104, and the roller 98 in a clockwise direction as indicated by the arrow 106, so that the rollers move the picked fruit downwardly between each roller and its adjacent side wall 92, and into the receiver 80, as will be more fully described later. Any suitable drive may be provided for the rollers 96 and 98, and as illustrated in FIGS. 2 and 4, a chain drive 108 with a reversing sprocket for one of the chains, for example, is driven by a suitable motor 110 which may be electrical, or preferably pneumatic or hydraulic in keeping with the type of operating cylinders 46, 56, and 66 of the positioning mechanism 16. The motor 110 is preferably reversible in order to aid in clearing the harvesting head should it become jammed, and the motor 110 and the chain drive 108 are preferably contained within a housing, as 112 for the motor.

The rollers 96 and 98 are illustrated as cylindrical and preferably have a core of hard material, such as aluminum or a hard plastic, covered with resiliently yieldable material having side surfaces 114, this material being of effectively uniform resiliency and yieldability so that each surface is uniformly resilient, rather than of varying axial resiliency as usually occurs with inflated rollers. The illustrated material defining the surfaces 114 each comprise a pair of medium hard, closed cell neroprene sponge rubber pads, each an inch thick, for a total of a 2 inch thickness and having a smooth outer surface with a high coefficient of friction with reference to surface of the fruit, such as DE-41 or DE-42, manufactured by Armstrong Cork Company, Charlotte, N.C. These pads are normally adhesively secured to cores of the rollers, and in each pair to each other. The inside surfaces of the side walls 92 are provided with resiliently yieldable pads 118 of about two inches thickness and the same characteristics as previously described with reference to the side faces. The pads 118 are secured to their respective side walls 92 in any suitable manner, and as illustrated by bolts 119 extending through holes in upper and lower portions of the pads and through the adjacent side walls. Any suitable material may be used for the pads, but the described material has been found to be highly successful in both grasping the fruit on the limbs and moving it through the harvesting head 14.

The cylindrical surfaces 114 and are each preferably spaced from and movable relative to the adjacent side wall pads 118, and therewith provide passageways 120 (FIG. 3) to the receiver 80 for passage of the fruit removed from the tree limb by the rotating rollers 96 and 98. Each passageway 120 (FIG. 3) has an elongated entrance 122 which is substantially longer than the minimum effective width of the passageway between the faces of the pads 114 and 118, so that the fruit may enter the passageway 120 at any random position along the entrance 122, and is moved by one of the rollers through the passageway and a passageway exit into the receiver 80 from which it passes through the tube 20 to the basket 22. Each passageway entrance 122 opens into a nip portion 123 of the passageway and the diameter of the rollers 96 and 98 and the minimum width of the nip portion 123 between the rollers and the side wall pads is proportioned with respect to the fruit being picked, so that the fruit is rotated to break the fruit loose from the limb and to then release the limb from the nip portion. Rotation of about 80° - 120° is usually adequate. As the fruit exits from the nip portion, it is no longer grasped between the roller face and the side wall pad, and should the limb have been grasped between the fruit and the roller or the pad, the limb will be released when the fruit exits the nip portion. It has also been found that a wedging angle 123b (FIG. 3), defined by a tangent to the roller and the face of the adjacent side wall pad, where the fruit simultaneously engages the rollers and side wall pad, should form an acute angle of approximately 20° to 35°, so that the fruit does not "float" at the passageway entrance but is drawn into the nip portion.

By way of example, it has been found that a roller, as 96 or 98, having an outside diameter of 9 inches, with a nip portion having a minimum width between the roller surface and the pad face of approximately 1¼ inches is preferably in handling fruit such as oranges of approximately 2 to 3 inch diameter. Roller speed may be varied but is preferably about 120 to 300 RPM.

Additionally, in the embodiment shown in FIGS. 2-4, the body has width of approximately 27 inches between the top edges of the side walls 92, with a roller length of approximately 24 inches, although these dimensions may be varied as desired. However, it is desirable that the width and depth of the harvesting head 14 be kept as small as practical to facilitate movement of the head into dense portions of the tree. The fixed side walls permit the passageway entrances to be proximate the sides of the head and provides a more compact head.

When a limb has been drawn into the body 44 by either of the rollers 96 or 98, it may tend to slide longitudinally of the passageway entrance 122. To limit such sliding, suitable stops 124 are provided, as may best be seen in FIGS. 3 and 4. Each stop 124 includes a member 126 having an eye received on a rod 128 secured to the opposite end walls 82, with washers 129 (FIG. 4) secured to the rod to hold the stops against movement along the rod. From the eye, the stop has an L-shaped elbow extending downwardly to a finger 130 (FIG. 3) pointed toward the adjacent roller. Thus, the stop is held against downward movement from the normal position shown in FIG. 3, so that any limb moving below the finger 130 will be prevented from moving longitudinally of the roller and the passageway entrance, but is free to move upwardly as it pivots the stop finger 130 upwardly about the rod 128. The stop is preferably weighted to drop by gravity from its elevated position to the position shown in FIG. 3, but if desired, suitable torsion springs (not shown) may be provided on the rod 128 for returning the stops to their normal position.

Figure 5:
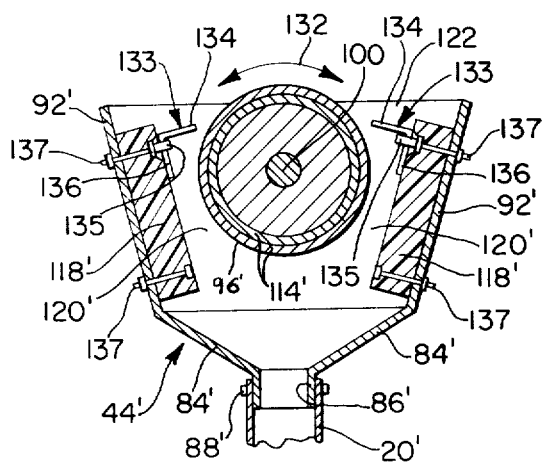
FIG. 5 is a fragmentary, schematic, sectional, elevational view, similar to FIG. 3, but of a preferred embodiment of the invention.
Figure 6:
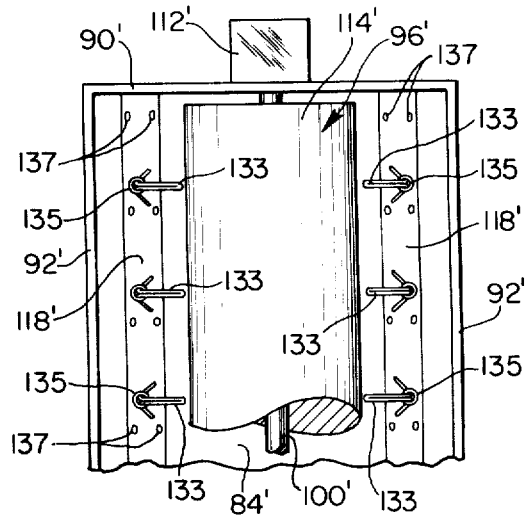
FIG. 6 is a fragmentary, schematic, plan view of the embodiment shown in FIG. 5.

With reference to the embodiment shown in FIGS. 5 and 6, similar reference numerals primed, as 96', identify parts similar or identical to those described in the embodiment of FIGS. 1-4, and in general these parts will not again be described. In the embodiment of FIGS. 5 and 6, a cylinder 96' has a resiliently yieldable cylindrical facing 114' and is driven by a reversible motor, as previously described, within a housing 112' (FIG. 6) so that the roller 96' may be driven in either of opposite directions, as indicated by the arrow 132 (FIG. 5), thus permitting the fruit to be deposited into passageways 120' on either side of the cylinder 96', and to clear a passageway in case of a jam. In this embodiment the tube 20' is shown secured to the bottom of the body 44'.

In this embodiment, stops 133 each include a finger 134 received in an eye bolt 135, lower ends 136 of the stop being transverse to the finger 134 and downwardly divergent from the eye of the bolt 135 to rest on the side wall pad 118, in normal position of the stop, and limit downward movement of the finger while permitting the finger to pivot upwardly and release a limb. The eye bolts, along with standard bolts 137 (FIG. 6), extend through the pad 118' and the side wall 92' and secure the upper portion of each pad 118' to the adjacent side walls 92'. The stops described with reference to FIGS. 2-4 and FIGS. 5 and 6, are interchangably applicable to any of the embodiments of the head.

Figure 7:
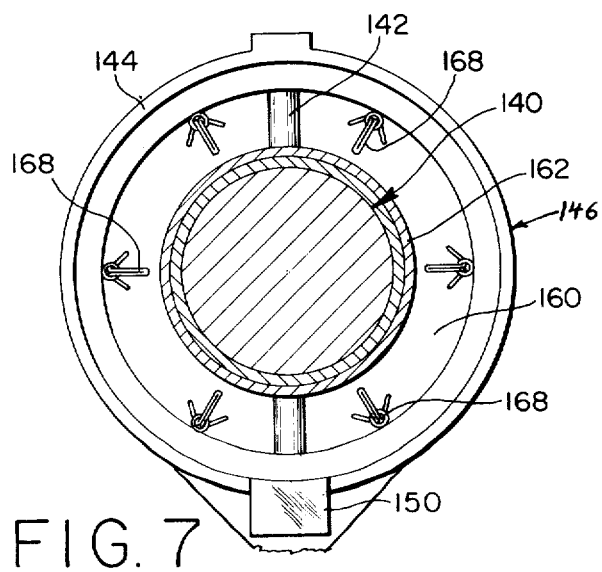
FIG. 7 is a fragmentary, schematic, plan view of still another embodiment of the invention.
Figure 8:
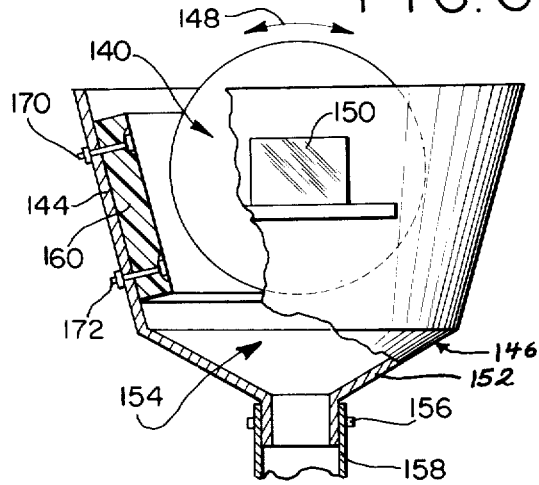
FIG. 8 is a fragmentary, schematic, elevational view of the embodiment shown in FIG. 7, with parts broken away and removed for clearer illustration.

In the embodiment shown in FIGS. 7 and 8, a rotary member in the form of a sphere 140 is mounted on a shaft 142 journaled in a generally inverted frusto-conical side wall 144 of a body 146, and is driven in either of opposite directions, as indicated by an arrow 148 (FIG. 8), by a reversible motor, as previously described, within a housing 150. The body 146 has an inverted frusto-conical lower wall 152 depending from the bottom of the side wall 144 and defining a receiver 154 having a connector 156 at its apex, for receiving a flexible and expansible tube 158 for discharging the fruit into a suitable receptacle, as previously described.

The side wall 144 is provided with a continuous facing 160 which is resiliently yieldable, of a type as previously described, and the sphere 140 is hard and provided with a resiliently yieldable outer facing 162, as previously described with reference to the rollers 96 and 98. Alternatively, the sphere may be inflated, or of any other suitable type of construction. Thus a continuous passageway 164 is provided between the spherical face 162 and the inner face of the side wall pad 160, so that the sphere 140 may deposit the fruit into an elongated or annular entrance 166 of the passageway 164, from which the fruit passes through the passageway and into the receiver 154 and then through the tube 158 to the basket. Fingers 168, as previously described, may be provided along the top portion of the side wall pad 160, and secure the top portion of the pad to the side wall 144, and standard bolts 170 are similarly provided for securing the pad to the side wall. Also as previously described, standard bolts 172 (FIG. 8) are provided for securing the bottom portion of the side wall pad 160 to the side wall 144.

Figure 9:
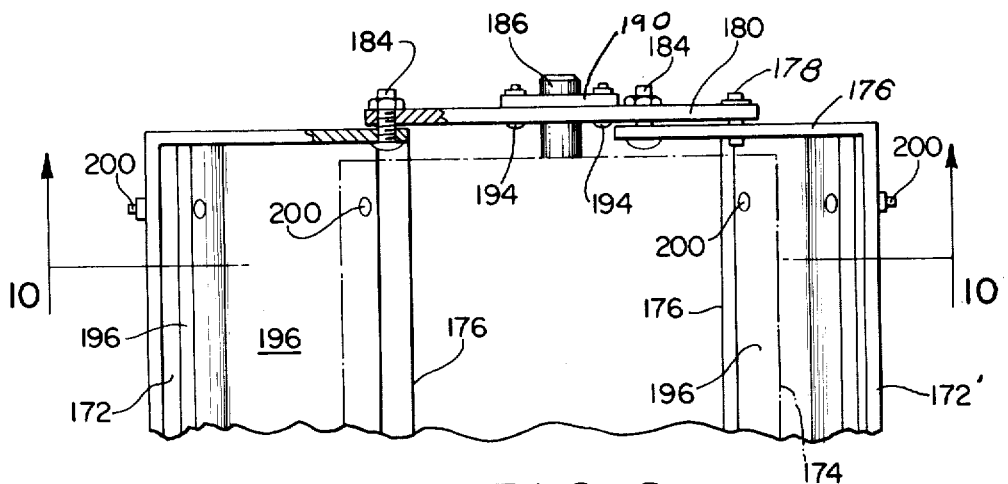
FIG. 9 is a fragmentary, schematic, top view of additional embodiments of the invention, each applicable to any of the preceeding embodiments, with parts broken away and removed for clearer illustration.
Figure 10:
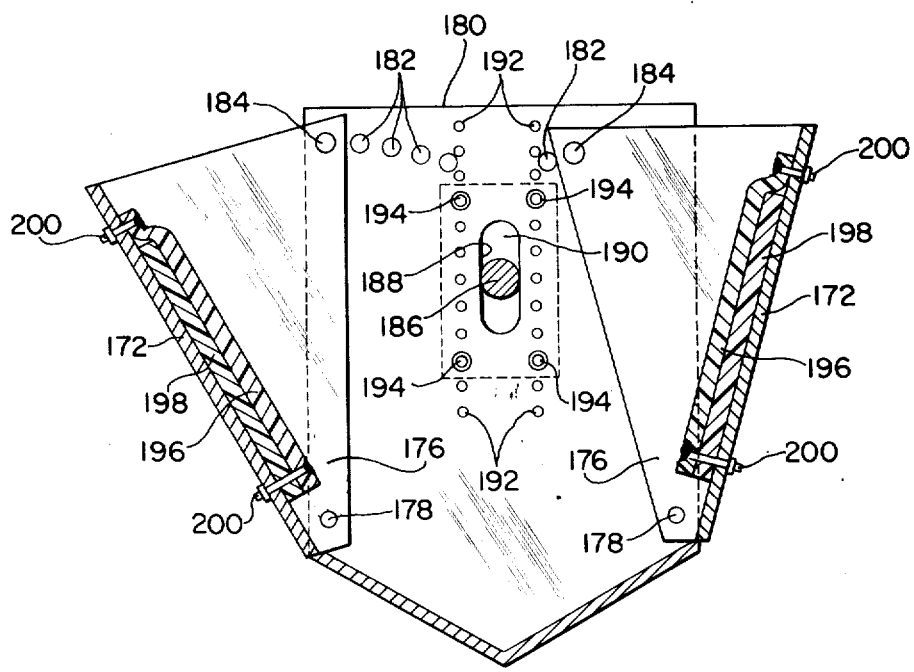
FIG. 10 is a schematic, sectional view taken generally along the line 10–10 in FIG. 9.

With reference to FIGS. 9 and 10, in order to adapt either the harvesting head of FIGS. 2–4 or FIGS. 5 and 6, for use in harvesting different diameters of fruits, such as oranges, tangerines, lemons, apples, berries, and so forth, it is desirable that the width of the nip portion 120 be variable, for reasons previously discussed with reference to the nip and roller size. The width of the nip portion between the roller face and the adjacent pad may be varied either by moving the upper portion of the body side walls 172 toward or away from the roller 174, or by moving the roller 174 up or down in the body of the harvesting head. Similarly in the embodiment of FIGS. 7 and 8, the sphere 140 may be moved up or down to vary the width of the nip portion.

In order to adjust the side wall 172', they may be provided with opposed end flanges 176 each secured by a pivot pin 178 to an adjacent end wall 180, each end wall being provided with series of holes, as 182, for receiving a bolt 184 extending through an aperture in an upper end of the associated flanges 176, so that the side wall may be pivoted in or out about its pivot pin 178 to vary the distance of its pad from the surface of the roller 174. While both side walls would normally have the same spacing from the roller, for purpose of illustration, the left side wall of FIG. 9 shows maximum spacing and the right side wall minimum spacing.

In order to vary the elevation of the roller 174, opposite ends of its shaft extend through a slot 188 and are journaled in plate members 190 adjustably secured to the adjacent end wall 180. One of the plate members 190 carries the motor and drive (not shown). As herein illustrated, each end wall has a pair of series of vertically spaced holes 192 for receiving bolts 194, one extending through holes in each of the four corners of the member 190, so that the roller can be adjustably secured in position.

Also as shown in FIGS. 9 and 10, the side wall pads, as 118 in the embodiments of FIGS. 2–4 and in FIGS. 5 and 6, may each comprise a pair of pads including an outer pad 196 and an inner pad 198. Each of these pads is preferably 1 inch thick, and of the previously described resiliently yieldable material. The pad 196 is secured by standard bolts 200, to the adjacent side wall 172, and the other pad 198 is positioned between the pad 196 and the side wall 172, as shown in FIG. 10. Lower end portions of the pads 196 and 198 are preferably similarly secured to the side wall 172 as by bolts 200. This modification permits replacement of the exposed pad 196, while retaining the pad 198, thus reducing replacement costs, and further provides for greater variation in overall resiliency and other characteristics of the composite pad.

When picking apples, or other fruit which may be bruised, the inside of the end and bottom walls may also be padded.

While this invention has been described with reference to particular embodiments in a particular environment, various changes may be apparent to one skilled in the art and the invention is therefore not to be limited to such embodiments or environment, except as set forth in the appended claims.

What is claimed is:

1. Harvesting apparatus for picking fruit from a limb, or the like, comprising opposed members forming a passageway with a converging entrance and a diverging exit and therebetween a nip portion and said members collectively defining a path through said nip portion from said entrance to said exit, said nip portion being of substantially less length along said path than the width of said path at said nip portion, means mounting said members spaced apart across the width of said nip portion for grasping the fruit in said passageway, said means further mounting said members with one of said members movable along said path and relative to a substantially operatively fixed one of the members, and said means including means for adjusting the width of said nip portion between the movable and fixed members to accommodate various size fruit, and means for moving the movable member along said path in a direction from said entrance to said exit for rotating the fruit and removing the fruit from the limb as the fruit is moved through said passageway.

2. Harvesting apparatus as set forth in claim 1 in which the adjusting means adjust the position of the movable member relative to the fixed member.

3. Harvesting apparatus as set forth in claim 1 in which the adjusting means adjust the position of the fixed member relative to the movable member.

4. Harvesting apparatus as set forth in claim 1 in which said entrance is proximate an upper portion of said fixed member, and said mounting means includes: a wall transverse to said fixed member, means securing a lower portion of said fixed member on said wall for swinging movement toward and away from said movable member about an axis generally normal to said path, to adjust the spacing between the fixed and movable members, and cooperating means on said wall and said fixed member releasably retaining said fixed member in adjusted position diverging upwardly and outwardly at said upper portion relative to said movable member, said movable member including a shaft mounted in a journal, and said mounting means further including means releasably mounting said journal in selected generally vertically adjusted positions on said wall for varying the width of said nip.

5. Harvesting apparatus for picking fruit from a limb, or the like, comprising opposed members forming a passageway with a converging entrance and a diverging exit and therebetween a nip portion and said members collectively defining a path through said nip portion from said entrance to said exit, said nip portion being of substantially less length along said path than the width of said path at said nip portion, said entrance being elongated and sufficiently longer than the distance between said members at said nip portion to receive simultaneously a plurality of pieces of fruit, means mounting said members spaced apart across the width of said nip portion for grasping the fruit in the passageway, said means further mounting said members with one of said members movable along said path and relative to a substantially operatively fixed one of the members, the mounting means further mounting said members to define an acute wedging angle of approximately 30 to 45° at the location of initial contact of the movable and fixed members with the fruit as the fruit enters said passageway, said mounting means further including means for adjusting the width of said nip portion between the movable and fixed members to accommodate various size fruit, the movable member being relatively convex and the fixed member being relatively flat in the direction of said path proximate said nip portion, and means for moving the movable member along said path in a direction from said entrance to said exit for rotating the fruit and removing the fruit from the limb as the fruit is moved through said passageway.

6. Harvesting apparatus for picking fruit from a limb or the like, comprising a harvesting head having adjacent and substantially coextensive opposed members, a pair of said members being outer walls operatively fixed relative to the head and along an outer peripheral portion of the head, said walls each having a free edge portion, one of said members between said pair of members having cylindrical face means opposed to said walls with nips therebetween and an effective width between the members at said nips for gripping the fruit and passing the fruit through a nip and with a nip entrance for receiving the fruit from the limb and retaining the fruit for receipt by said nip, said nip and said entrance having a length substantially greater than said width of said nip and sufficiently long to provide means for simultaneously receiving a plurality of generally spherical fruits along said length of said entrance and said nip, said entrance being generally coextensive with and extending substantially to the associated edge portion to facilitate accurate positioning of said entrance for receiving fruit on the limb, portions of said members at said nips being resiliently yieldable to the fruit, means mounting the one member for movement transversely of said length of said nip, and drive means for moving said one member transversely of said length selectively in opposite directions for moving fruit in said entrance through the associated nip, and means for locating said head for picking the fruit, the locating means being secured to an end portion of said head and being operable for selectively swinging said head from side to side and normally operatively positioning said head with said edge portions at upper portions of said walls, and said head having sides transverse to said end portion and said sides comprising said walls.

* * * * *